United States Patent Office 3,546,344
Patented Dec. 8, 1970

3,546,344
PREPARATIONS CONTAINING UREA OR THIOUREA DERIVATIVES FOR USE AS MOLLUSCICIDES
Henry Martin and Dieter Duerr, Basel, Hans-Rudolf Hitz, Muttenz, and Marcus Von Orelli, Muenchenstein, Switzerland, assignors to Ciba Limited, Basel, Switzerland, a company of Switzerland
No Drawing. Original application Feb. 15, 1967, Ser. No. 616,196, now abandoned. Divided and this application Dec. 12, 1968, Ser. No. 804,032
Claims priority, application Switzerland, Mar. 8, 1966, 3,294/66
Int. Cl. A01n 9/20
U.S. Cl. 424—322       3 Claims

ABSTRACT OF THE DISCLOSURE

A method for combating molluscs which comprises applying as active principle to the area where said effect is desired a molluscicidal amount of a compound of the formula

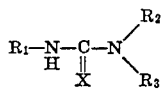

in which $R_1$ represents a member selected from the group consisting of a (a) phenyl, (b) phenyl substituted at up to two places by a member selected from the group consisting of chlorine, bromine, —$CF_3$, lower alkyl, —$NO_2$, —CN, —SCN and —$SCH_3$, (c) lower alkyl phenyl, (d) lower alkyl phenyl substituted in the phenyl nucleus by a radical as set forth above under (a), (b) and (c), (e) naphthyl, and (f) phenylloweralkylene; $R_2$ represents a member selected from the group consisting of the radicals set forth above under (a), (b), (c), (d) and (f), alkyl containing up to 8 carbon atoms, lower chloroalkylene, lower alkoxy, phenoxyphenyl and phenoxyphenyl substituted in the phenyl nuclei by at most 2 chlorine atoms, $R_3$ represents a member selected from the group consisting of hydrogen and lower alkyl, and X represents a member selected from the group consisting of oxygen and sulfur.

---

This is a division of application Ser. No. 616,196 filed Feb. 15, 1967, now abandoned.

The present invention relates to preparations for combating molluscs, especially for combating watersnails, which comprises a compound of the formula

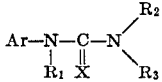

wherein Ar represents an aryl or aralkyl group, $R_1$ represents hydrogen or a lower alkyl group, $R_2$ represents a hydrogen atom, an aliphatic group, especially an alkyl group, alkenyl, halogenalkyl, halogenalkenyl, alkoxyalkyl or cyanalkyl group, an aromatic group or an araliphatic group, and $R_3$ represents a hydrogen atom, a lower alkoxy or a lower alkyl group, and X represents an oxygen or a lower alkyl group.

In the abovementioned formula Ar, as stated in the definition, represents an aryl or aralkyl group. The aryl group may be substituted by one or more groups, for example, by halogen, alkyl, alkoxy, alkylthio, aryloxy, arylthio, hydroxy, thiol, acyloxy, acylthio, or by one or more of the groups —$CF_3$, —CN, —$NO_2$, SCN,

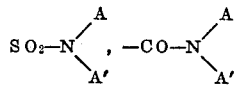

—COOA, —COA, in which A and A' represents hydrogen or a lower alkyl group.

The term "lower" as applied herein to alkyl, alkoxy, and alkylthio groups is to be understood as meaning groups that contain up to at most 4 carbon atoms.

The group Ar may be monocyclic, dicyclic or polycyclic; it may, for example, consist of a phenyl group, a naphthyl group, a dicyclopentadienyl group of a methanoindanyl group.

The group $R_2$, if it represents an aromatic group, may be the same, and/or may be substituted in the same way as Ar.

Especially effective are preparations in which the active component is at least one urea or thiourea of formula

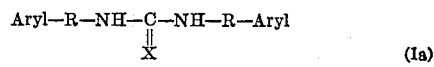

in which aryl represents a monocyclic or polycyclic aryl group which may be substituted by a halogen atom, especially a chlorine atom, by alkyl, $CF_3$, nitro or SCN, and R represents an optionally unsaturated alkylene group having 1 to 4 carbon atoms, or one or both of the symbols R represents the direct bond between aryl and NH and X represents an oxygen or sulphur atom.

A further group of interesting preparations for combating snails, are those which contain, as the active component, at least one urea or thiourea of formula

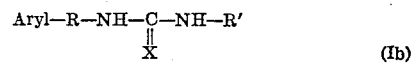

in which aryl represents a phenyl, naphthyl or methanoindanyl group, which may be substituted by a halogen atom, especially a chlorine or bromine atom, an alkyl, alkoxy, nitro, $CF_3$ or SCN group, and R represents an optionally unsaturated alkylene group having 1 to 4 carbon atoms or the direct bond between aryl and NH, and in which R' represents an aliphatic group having 3 to 7 carbon atoms, especially an alkyl, alkenyl or halogenalkenyl group, and X represents an oxygen or sulphur atom.

A further group of interesting preparations for combating snails, are those which contain, as active components, a urea or thiourea of formula

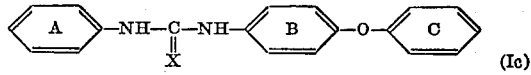

in which X represents an oxygen or sulphur atom and the phenyl nuclei A, B and C may be substituted by halogen atoms, especially by chlorine atoms, trifluoromethyl, nitro, alkoxy and alkyl in many different ways.

The following categories and kinds of snails may be combated with the materials initially referred to: edible snails (Helix), Arion, lettuce snails, slugs (Limax), Deroceras as well as snails which transmit the cause of bilharziosis, and the snails Planorbis, Bulinus, Biomphalaria, Australorbis glabratus and others, which serve as a temporary host.

The compounds are not only effective against the snails themselves but also against their eggs.

The preparations of the invention may be formulated in many different ways. They are advantageously used in the form of a "wettable powder." Since the active substances are generally solid substances, they may be finely ground together with a carrier, for example, silicon dioxide, bolus, diatomaceous earth and kaolin, and wetting agents and emulsifiers and may then be diluted with water as desired in order to obtain stable dispersions.

Those active substances which contain acid functional groups may be used in the form of alkali, alkaline earth or ammonium and alkyl-ammonium salts and those which contain basic functional groups may be used in the form of salts with inorganic or organic acids.

The majority of the active substances of Formula I are known. They may be manufactured by the usual methods for the manufacture of ureas. The preferred method consists of reacting an amine with an isocyanate in a solvent which is free of hydroxyl groups, optionally in the presence of tertiary bases, for example, triethylamine, trimethylamine or triethylene diamine.

The following examples illustrate the invention:

EXAMPLE 1

N-4-chlorobenzyl-N'-4-chloro-3-trifluoromethylphenylurea

A solution of 32.2 g. of 4-chloro-3-trifluoromethylphenyl-isocyanate in 50 ml. of dioxane is added drop by drop, to a solution of 21.3 g. of 4-chlorobenzylamine in 100 ml. of dioxane, while stirring. After 30 minutes, a product which can be recrystallised from alcohol is precipitated by adding 500 ml. of water. Yield 43 g. Melting point 159–160.5° C. (if the melting point sample is rapidly heated).

EXAMPLE 2

N-3,4-dichlorobenzyl-N'-3,4-dichlorophenyl-thiourea 21.3 g. of 3,4-dichlorobenzylamine hydrochloride in 150 ml. of acetonitrile are treated with 14 ml. of triethylamine. 20.4 g. of 3,4-dichlorophenylisothiocyanate in 20 ml. of acetonitrile are added drop by drop, to the resulting sludge, while stirring. Thereupon the temperature rises to approximately 35° and the contents of the flask become clear. After about 2 hours the reaction solution is stirred into approximately 500 ml. of water. The resulting precipitate is collected and recrystallised from alcohol. Yield 33 g. Melting point 133.5–134°.

EXAMPLE 3

(a) A mixture containing the following components is manufactured:

| Component | Percent |
|---|---|
| Bolus alba | 25 |
| SiO$_2$ (Hisil) | 20 |
| Active substance | 50 |
| Emulsifier (Invadin JFC) | 3.5 |
| Wetting agent (Ultravon C) | 1.5 |

The entire mixture is finely ground in a ball mill. A powder which can be very easily dispersed in water is thus obtained. [W.P.]

EXAMPLE 4

50 g. of active substance are dissolved in 100 g. of xylene together with 25 g. of a xylene-soluble emulsifier and the entire mixture is made up to 200 g. with xylene. A 25% strength emulsion concentrate (EC) is obtained, which can be diluted with water as desired.

EXAMPLE 5

The preparations were tested as EC or WP and as solutions in DMF or DMSO. The solutions were diluted with acetone to a concentration of 1000 p.p.m. The requisite amount of this stock solution was directly added to 200 ml. of water. The LC 100 was determined with the following approximate dilution series:

p.p.m. 6–3–1.5–0.75–0.38–0.19–0.1

All preparations formulated with DMF or DMSO were formulated according to the following scheme: 0.5 g. of pure substance +0.5 ml. of emulsifier (Tween 80) were dissolved in 5 ml. of DMF. Most of the substances dissolved rapidly. The solution was then made up to 10 ml. with acetone. If 5 ml. of DMF did not suffice to make a solution, the mixture was made up to 10 ml. with DMF. If it proved that DMF was not a suitable solvent, the mixture was made up to 10 ml. and in exceptional cases to 20 ml. with DMSO.

8 snails (*Australorbis glabratus*) of 1–1.5 cm. shell diameter were kept for 24 hours in 450 ml. of an aqueous dispersion containing 6 p.p.m. of active substance, at 20–22° C. After this treatment, the snails were transferred to fresh water and were examined therein after 48 hours. If it was found that they had been 100 percent killed, the dilution was continued as described above. The following values were determined.

| Compound | Melting point, °C. | Formulation | LC 100 |
|---|---|---|---|
| 3-CF$_3$,4-Cl-C$_6$H$_3$-NH-C(S)-NH-CH$_2$-C$_6$H$_4$-Cl (4-Cl) | 143–145 | DMF | 0.2 |
| 3,4-Cl$_2$-C$_6$H$_3$-CH$_2$-NH-C(S)-NH-CH$_2$-C$_6$H$_3$-3,4-Cl$_2$ | 174 | DMF | 0.2 |
| 4-Cl-C$_6$H$_4$-CH$_2$-NH-C(O)-NH-C$_6$H$_4$-CF$_3$ (3-CF$_3$,4-Cl) | 159–160 | DMF | 0.4 |
| 3,4-Cl$_2$-C$_6$H$_3$-CH$_2$-NH-C(S)-NH-C$_6$H$_3$-3,4-Cl$_2$ | 134 | DMF | 0.4 |
| 3,4-Cl$_2$-C$_6$H$_3$-CH$_2$-NH-C(S)-NH-C$_6$H$_3$-3,4-Cl$_2$ | 158–159 | DMF | 0.4 |
| 3,4-Cl$_2$-C$_6$H$_3$-CH$_2$-NH-C(S)-NH-CH$_2$-C$_6$H$_3$-3,4-(CH$_3$)$_2$ | 127 | DMF | 0.75 |

TABLE—Continued

| Compound | Melting point, °C. | Formulation | LC 100 |
|---|---|---|---|
| 2,5-bis(CF₃)-C₆H₃-NH-C(S)-NH-C₆H₄-4-NO₂ | 180–182 | DMF | 0.75 |
| 3,4-Cl₂-C₆H₃-CH₂-NH-C(S)-NH-C₆H₃(2-CH₂)-4-Cl | 142–143 | DMF | 2 |
| 3,4-Cl₂-C₆H₃-CH₂-CH₂-NH-C(S)-NH-C₆H₃-3-Cl-4-Cl | 98–99 | DMF | 2 |
| 3,4-Cl₂-C₆H₃-CH₂-NH-C(O)-NH-C₆H₃-2,5-(CF₃)₂ | 209 | DMF | 3 |
| 3,4-Cl₂-C₆H₃-CH₂-NH-C(O)-NH-C₆H₃-3,4-Cl₂ | 200–201 | DMF | 3 |
| N=C=S-C₆H₄-NH-C(S)-NH-C₆H₃-2,5-(CF₃)₂ | 122 | DMF | 3 |
| 3-CF₃-4-Cl-C₆H₃-NH-C(S)-NH-C₄H₉ | 71.5 | EC 10 | 3 |
| 3,4-Cl₂-C₆H₃-NH-C(O)-NH-CH₂-CH(C₂H₅)-(CH₂)₃-CH₃ | 66 | EC 10 | 3 |
| 2,5-(CF₃)₂-C₆H₃-NH-C(O)-NH-C₄H₉ | 121–123 | WP 50 | 6 |
| 4-Cl-C₆H₄-NH-C(S)-NH-C₂H₄-C₆H₃-3,4-Cl₂ | 162–163 | DMF | 0.4 |
| 2,5-(CF₃)₂-C₆H₃-NH-C(S)-NH-CH₂-C₆H₃-3,4-Cl₂ | 168–169 | DMF | 0.2 |
| 2,5-(CF₃)₂-C₆H₃-NH-C(S)-NH-CH₂-C₆H₄-4-Cl | 172–173 | DMF | 0.2 |
| 3-CH₃-C₆H₄-NH-C(S)-N(OCH₃)(CH₃) | | DMF | 3 |
| 2,5-(CF₃)₂-C₆H₃-NH-CO-NH-C₆H₃-2,5-(CF₃)₂ | 235 | DMF | 0.4 |

TABLE—Continued

| Compound | Melting point, °C. | Formulation | LC 100 |
|---|---|---|---|
| 3-CF₃-C₆H₄-NH-CO-NH-C₆H₄-3-CF₃ | 203 | DMF | 3 |
| 3,4-Cl₂-C₆H₃-NH-CS-NH-CH₂-CH₂-C₆H₄-4-Cl | 100–103 | DMF | 0.75 |
| 3,5-(CF₃)₂-C₆H₃-NH-CS-NH-C₅H₁₁ | 103–104 | WP 50 | 3 |
| C₆H₅-CH₂-CH₂-CH₂-NH-CS-NH-C₆H₃-3,4-Cl₂ | 62 | DMF | 3 |
| 3,4-(CH₃)₂-C₆H₃-CH₂-NH-CS-NH-CH₂-C₆H₃-2,3-(CH₃)₂ | 102–103 | DMF | 3 |
| 3,4-Cl₂-C₆H₃-CH₂-CH₂-NH-CS-NH-CH₂-CH₂-C₆H₃-3,4-Cl₂ | 125–127 | DMF | 1.5 |
| 2,4-Cl₂-C₆H₃-CH₂-NH-CS-NH-CH₂-C₆H₃-2,4-Cl₂ | 180–181 | DMF | 3 |
| 2,4-Cl₂-C₆H₃-CH₂-CH₂-NH-CS-NH-CH₂-CH₂-C₆H₃-2,4-Cl₂ | 122–124 | DMF | 3 |
| 3-CH₃-5-CF₃-C₆H₃-NH-CO-NH-C₆H₄-4-Cl | 214–216 | DMF | 0.75 |
| 3,5-(CF₃)₂-C₆H₃-NH-CO-NH-C₆H₄-3-CF₃ | 165–167 | DMF | 0.19 |
| 3,5-(CF₃)₂-C₆H₃-NH-CO-NH-C₆H₄-3-Br | 174–175 | DMF | 0.75 |
| 3,5-(CF₃)₂-C₆H₃-NH-CO-NH-C₆H₃-3-CF₃-4-Cl | 177–178 | DMSO | 0.2 |
| 3,5-(CF₃)₂-C₆H₃-NH-CO-NH-C₆H₃-3,5-(CF₃)₂ | 253–256 | DMF | 0.38 |
| 4-Cl-3-CF₃-C₆H₃-NH-CS-NH-C₆H₃-3,4-Cl₂ | 157–158 | DMF | 0.38 |
| 4-Cl-3-CF₃-C₆H₃-NH-CS-NH-C₆H₃-3-CF₃-4-Cl | 165–166.5 | DMF | 0.38 |

| Compound | Melting point, °C. | Formulation | LC 100 |
|---|---|---|---|
| 3,5-(CF₃)₂-C₆H₃-NH-CO-NH-C₆H₃(2-Cl)(4-NO₂) | 211–212 | DMF | 0.38 |
| 3,5-(CF₃)₂-C₆H₃-NH-CO-NH-C₆H₃(2-Cl)(5-Cl) | 219–219.5 | DMF | 0.75 |
| 4-Cl-C₆H₄-NH-C(S)-NH-C₆H₃(3-Cl)(4-Cl) | 157.5 | DMF | 0.75 |
| 3,5-(CF₃)₂-C₆H₃-NH-CO-NH-C₆H₄-4-NO₂ | 300–305 | DMF | 0.75 |
| 3,5-(CF₃)₂-C₆H₃-NH-CO-NH-C₆H₃(3-Br)(4-Br) | 232 | DMF | 1.5 |
| 3-CF₃-C₆H₄-NH-CO-NH-C₆H₃(3-Cl)(4-Br) | 187 | DMF | 1.5 |
| 3,5-(CF₃)₂-C₆H₃-NH-CO-NH-C₆H₄-4-SCN | 204–205 | DMF | 3 |
| 3,5-(CF₃)₂-C₆H₃-NH-CO-NH-CH(CH₃)₂ | 175–177.5 | DMF | 3 |
| 1-naphthyl-NH-CO-NH-CH₂-CH₂-CH₃ | 191–192 | DMSO | 3 |
| 3,5-(CF₃)₂-C₆H₃-NH-CO-NH-CH₂-CH₂-CH₃ | 137–138 | DMF | 1.5 |
| 3,5-(CF₃)₂-C₆H₃-NH-C(S)-NH-CH(CH₃)₂ | 161.5–162 | DMF | 3 |
| 3,5-(CF₃)₂-C₆H₃-NH-C(S)-NH-CH₂-CH₂-CH₃ | 124.5–126 | DMF | 3 |
| C₆H₅-NH-CO-NH-CH(CH₃)₂ | 157–158 | DMF | 3 |
| 4-Cl-3-CF₃-C₆H₃-NH-C(S)-NH-CH(CH₃)₂ | 133–134 | DMF | 3 |

TABLE—Continued

| Compound | Melting point, °C. | Formulation | LC 100 |
|---|---|---|---|
| Cl-⟨⟩(Cl)-NH-CO-NH-⟨⟩-O-⟨⟩-Cl | 172.5–173.5 | DMF | 3 |
| (CF₃)₂-⟨⟩-NH-CO-NH-⟨⟩(Cl)-Cl | 227 | IMF | 1.5 |
| (CF₃)₂-⟨⟩-NH-CO-NH-⟨⟩(Cl)-O-⟨⟩ | 186–187 | DMF | 3 |
| (CF₃)₂-⟨⟩-NH-CS-NH-⟨⟩(Cl)-Cl | 138–139 | DMF | 1.5 |
| (CF₃)₂-⟨⟩-NH-CS-NH-⟨⟩(CF₃)-Cl | 138.5–139 | DMF | 0.75 |
| (CF₃)₂-⟨⟩-NH-CS-NH-⟨⟩(CF₃)-CF₃ | 184.5–186 | DMF | 0.75 |
| Cl-⟨⟩(CF₃)-NH-CS-NH-⟨⟩-Cl | 144–145 | DMF | 0.75 |
| (CF₃)₂-⟨⟩-NH-CS-NH-⟨⟩-Cl | 150–151 | DMF | 0.75 |
| (CF₃)₂-⟨⟩-NH-CO-NH-⟨⟩-C≡N | 252–253 | DMF | 3 |
| (CF₃)₂-⟨⟩-NH-CO-NH-⟨⟩-SCH₃ | 158–159.5 | DMF | 1.5 |
| (CF₃)₂-⟨⟩-NH-CS-NH-⟨⟩-SCH₃ | 125–127 | DMF | 3 |
| Cl-⟨⟩(Cl)-NH-CS-NH-CH₂-C(Cl)=CH₂ | 86–89 | IMF | 3 |

We claim:
1. A method for combating molluscs which comprises applying to the area where said combating is desired a molluscicidally effective amount of a compound having the formula

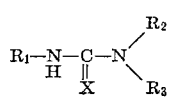

wherein $R_1$ is
(a) unsubstituted phenyl or unsubstituted phenylloweralkylene,
(b) substituted phenyl or substituted phenylloweralkylene containing up to two substituents in the phenyl ring selected from the group consisting of chlorine, bromine, —$CF_3$, lower alkyl and —SCN or
(c) naphthyl;

$R_2$ is
(a) unsubstituted phenyl or unsubstituted phenyllower-alkylene,
(b) substituted phenyl or substituted phenylloweralkylene containing up to two substituents in the phenyl ring selected from the group consisting of chlorine, bromine, —$CF_3$, lower alkyl, —SCN, —$NO_2$, —CN and —$SCH_3$,
(c) alkyl containing up to 8 carbon atoms,
(d) lower chloroalkylene,
(e) lower alkoxy,
(f) phenoxyphenyl or
(g) phenoxyphenyl substituted in the phenyl nuclei by at most two chlorine atoms, $R_3$ is hydrogen or methyl and X is oxygen or sulfur.

2. A method as claimed in claim 1, wherein there is used as active principle a molluscicidal amount of the compound of the formula

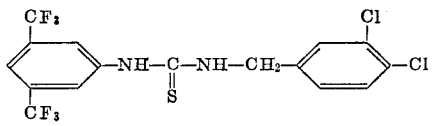

3. A method as claimed in claim 1, wherein there is used as active principle a molluscicidal amount of the compound of the formula

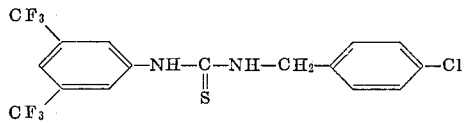

References Cited
UNITED STATES PATENTS

| | | | |
|---|---|---|---|
| 3,090,723 | 5/1963 | Pastac | 424—322 |
| 3,151,023 | 9/1964 | Martin | 424—322 |
| 3,340,144 | 9/1967 | Martin et al. | 424—322 |
| 3,365,360 | 1/1968 | Taylor | 424—322 |

ALBERT T. MEYERS, Primary Examiner

D. M. STEPHENS, Assistant Examiner

U.S. Cl. X.R.

424—302, 304